US012647615B2

(12) United States Patent
Peringassery Krishnan et al.

(10) Patent No.: US 12,647,615 B2
(45) Date of Patent: Jun. 2, 2026

(54) SYSTEMS AND METHODS OF USING ADAPTIVE TRANSFORM KERNEL SIZES

(71) Applicant: Tencent America LLC, Palo Alto, CA (US)

(72) Inventors: Madhu Peringassery Krishnan, Palo Alto, CA (US); Xin Zhao, Palo Alto, CA (US); Yushin Cho, Palo Alto, CA (US); Liang Zhao, Palo Alto, CA (US); Han Gao, Palo Alto, CA (US); Jing Ye, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 6 days.

(21) Appl. No.: 18/786,304

(22) Filed: Jul. 26, 2024

(65) Prior Publication Data

US 2025/0310563 A1 Oct. 2, 2025

Related U.S. Application Data

(60) Provisional application No. 63/570,220, filed on Mar. 26, 2024.

(51) Int. Cl.
| | |
|---|---|
| *H04N 19/61* | (2014.01) |
| *H04N 19/122* | (2014.01) |
| *H04N 19/159* | (2014.01) |
| *H04N 19/176* | (2014.01) |

(52) U.S. Cl.
CPC ........... *H04N 19/61* (2014.11); *H04N 19/122* (2014.11); *H04N 19/159* (2014.11); *H04N 19/176* (2014.11)

(58) Field of Classification Search
CPC .... H04N 19/61; H04N 19/122; H04N 19/159; H04N 19/176
USPC ...................................................... 375/240.12
See application file for complete search history.

(56) References Cited

U.S. PATENT DOCUMENTS

| | | | |
|---|---|---|---|
| 2014/0177713 A1 | 6/2014 | Yuan et al. | |
| 2018/0302631 A1 | 10/2018 | Chiang et al. | |
| 2022/0394300 A1 | 12/2022 | Koo et al. | |
| 2023/0078100 A1 | 3/2023 | Peringassery Krishnan et al. | |
| 2023/0085672 A1 | 3/2023 | Yea et al. | |

OTHER PUBLICATIONS

Tencent America LLC, ISRWO, PCT/US2024/041110, Oct. 18, 2024, 25 pgs.

*Primary Examiner* — Nguyen T Truong
(74) *Attorney, Agent, or Firm* — Morgan, Lewis & Bockius LLP

(57) ABSTRACT

An example method of video decoding includes receiving a video bitstream comprising a set of encoded blocks and a corresponding set of transform coefficients. The method also includes selecting a non-separable secondary transform from a set of one or more non-separable secondary transforms based an index value. The method further includes determining, based on coded information, a kernel size and kernel shape for the non-separable secondary transform, and decoding the set of encoded blocks by applying the non-separable secondary transform with the determined kernel size and kernel shape to the set of encoded blocks.

17 Claims, 7 Drawing Sheets

Figure 1:
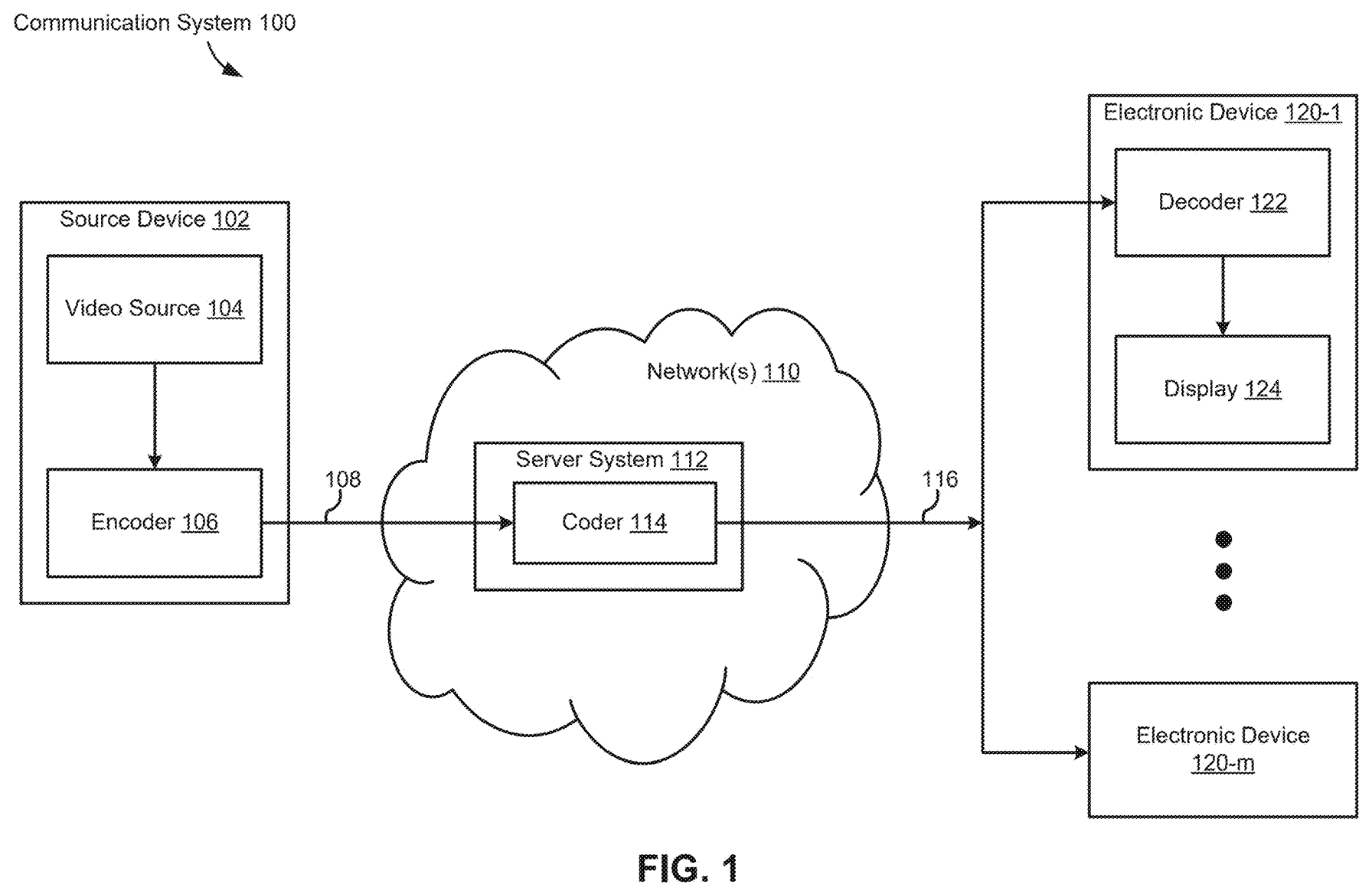

Communication System 100

Electronic Device 120-1

Decoder 122

Display 124

Electronic Device 120-m

Network(s) 110

Server System 112

Coder 114

116

108

Source Device 102

Video Source 104

Encoder 106

FIG. 4D 031384-8293-US
Page 6 of 7

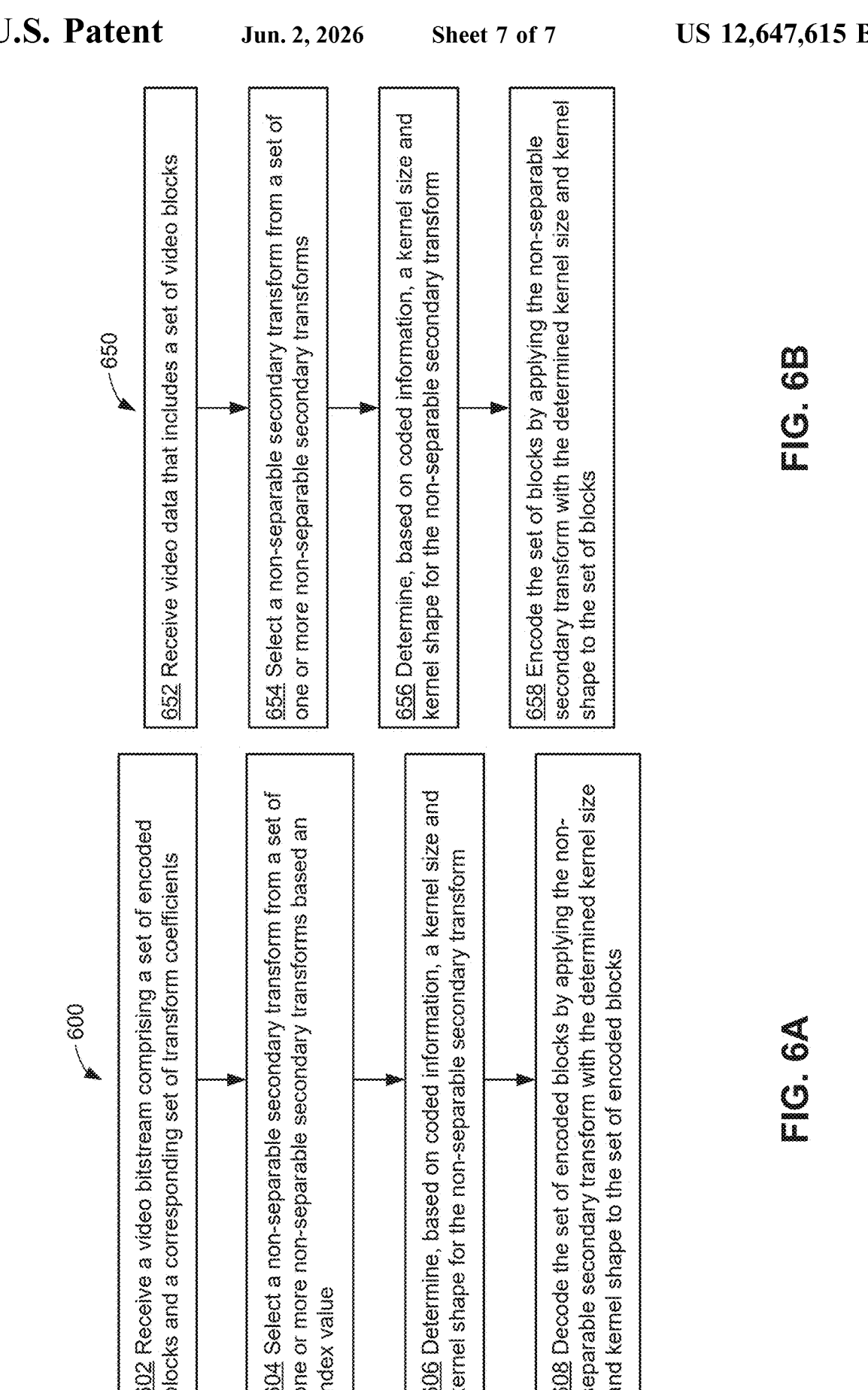

650

652 Receive video data that includes a set of video blocks

654 Select a non-separable secondary transform from a set of one or more non-separable secondary transforms 656 Determine, based on coded information, a kernel size and kernel shape for the non-separable secondary transform 658 Encode the set of blocks by applying the non-separable secondary transform with the determined kernel size and kernel shape to the set of blocks

602 Receive a video bitstream comprising a set of encoded blocks and a corresponding set of transform coefficients 604 Select a non-separable secondary transform from a set of one or more non-separable secondary transforms based an index value 606 Determine, based on coded information, a kernel size and kernel shape for the non-separable secondary transform 608 Decode the set of encoded blocks by applying the non-separable secondary transform with the determined kernel size and kernel shape to the set of encoded blocks

FIG. 6A

SYSTEMS AND METHODS OF USING ADAPTIVE TRANSFORM KERNEL SIZES

RELATED APPLICATIONS

This application claims priority to U.S. Provisional Patent Application No. 63/570,220, entitled "Adaptive Kernel Sizes for Secondary Non-Separable Transforms," filed Mar. 26, 2024, which is hereby incorporated by reference in its entirety.

TECHNICAL FIELD

The disclosed embodiments relate generally to video coding, including but not limited to transform coding applied to prediction residuals.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes, amongst other things, a set of methods for video (image) compression, including methods for using coded information to adaptively determine transform parameters (e.g., kernel sizes, shapes, and/or scanning orders). The coded information refers to any information that is known to both encoder and decoder when decoding a current block (e.g., signaled information and derived information). The transform parameters may be used for a primary transform and/or a secondary transform. The transform parameters may be used for a separable or non-separable transform. Adaptive transform parameters allow for smaller sizes to be used when appropriate, which provides a benefit in hardware implementation, e.g., smaller sizes resulting in increased throughput and/or less hardware components (e.g., fewer logic gates).

In accordance with some embodiments, a method of video decoding includes (i) receiving a video bitstream (e.g., a coded video sequence) comprising a set of encoded blocks and a corresponding set of transform coefficients; (ii) selecting a transform (e.g., a primary transform and/or a secondary transform) from a set of one or more transforms; (iii) determining, based on coded information, a kernel size and kernel shape for the selected transform; and (iv) decoding the set of encoded blocks by applying the selected transform with the determined kernel size and kernel shape to the set of encoded blocks.

In accordance with some embodiments, a method of video encoding includes (i) receiving video data (e.g., a source video sequence) comprising a set of blocks; (ii) selecting a transform (e.g., a primary transform and/or a secondary transform) from a set of one or more transforms; (iii) determining, based on coded information, a kernel size and kernel shape for the selected transform; and (iv) encoding the set of blocks by applying the transform with the determined kernel size and kernel shape to the set of blocks.

In accordance with some embodiments, a method of bitstream conversion includes (i) obtaining a source video sequence that comprises a plurality of frames; and (ii) performing a conversion between the source video sequence and a video bitstream of visual media data according to a format rule. The video bitstream comprises a set of encoded blocks and a corresponding set of transform coefficients. The format rule specifies that: (a) a transform (e.g., a non-separable transform) for the set of encoded blocks be selected from a set of one or more transforms, and (b) a kernel size and kernel shape for a selected transform be determined based on coded information.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIGS. 4A-4D illustrate example coding tree structures in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
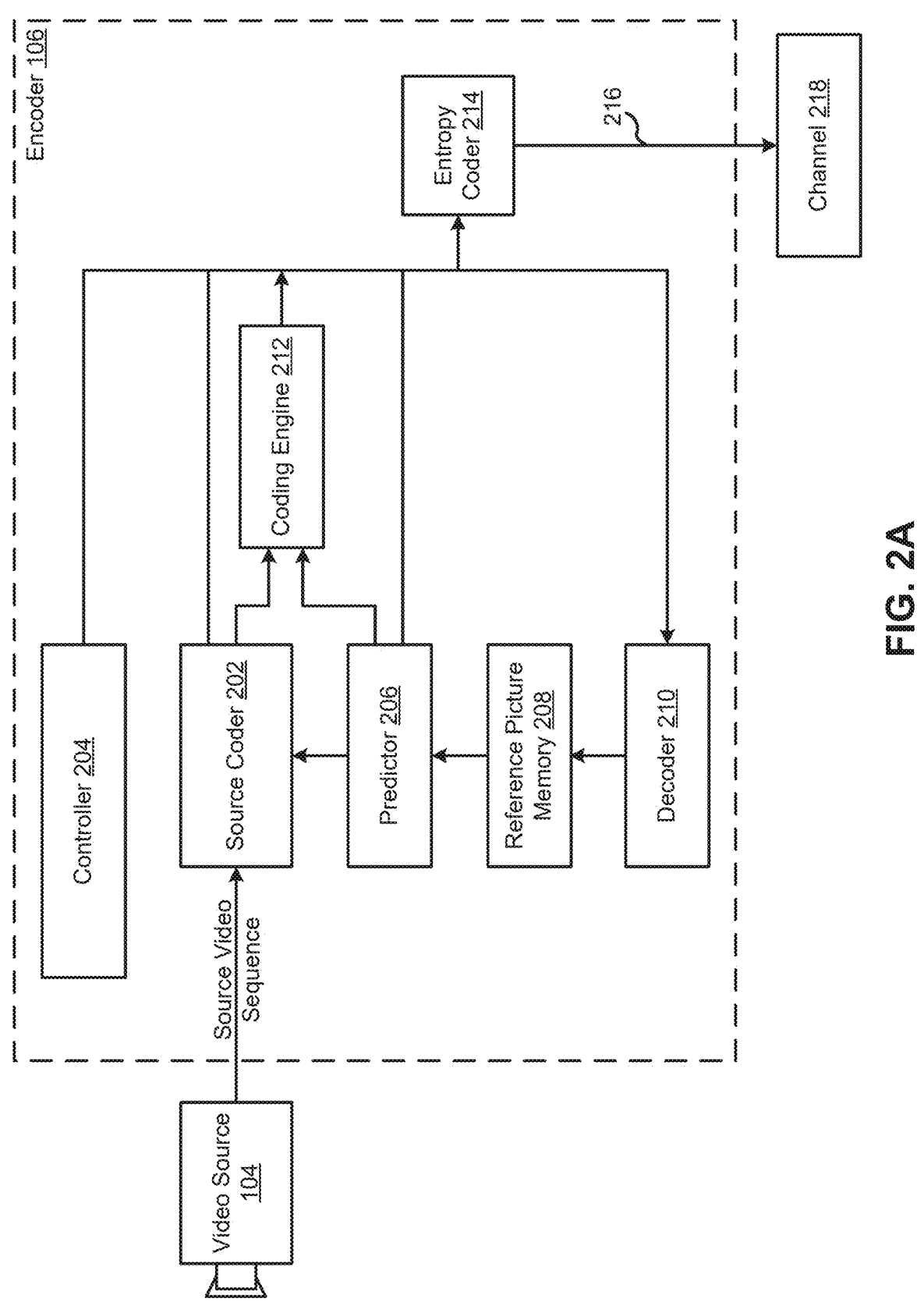
FIG. 2A is a block diagram illustrating example elements of an encoder component in accordance with some embodiments.

The present disclosure describes, amongst other things, a set of methods for video (image) compression, including methods for applying transforms on residual blocks and adaptively determining transform parameters. For example, a non-separable transform (e.g., primary or secondary) may be selected from a set of available transforms. The transform parameters (e.g., kernel size and/or shape) for the selected non-separable transform may be determined using coded information that is available to both the encoder and the decoder. In this way, the transform parameters may be adaptively adjusted during encoding and decoding. Adaptive transform parameters allow for smaller sizes to be used when appropriate, which provides a benefit in hardware implementation, e.g., smaller sizes resulting in increased throughput and/or less required hardware components.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-m) that are communicatively coupled to one another via one or more networks. In some embodiments, the communication system 100 is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream

108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. Additionally, the description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
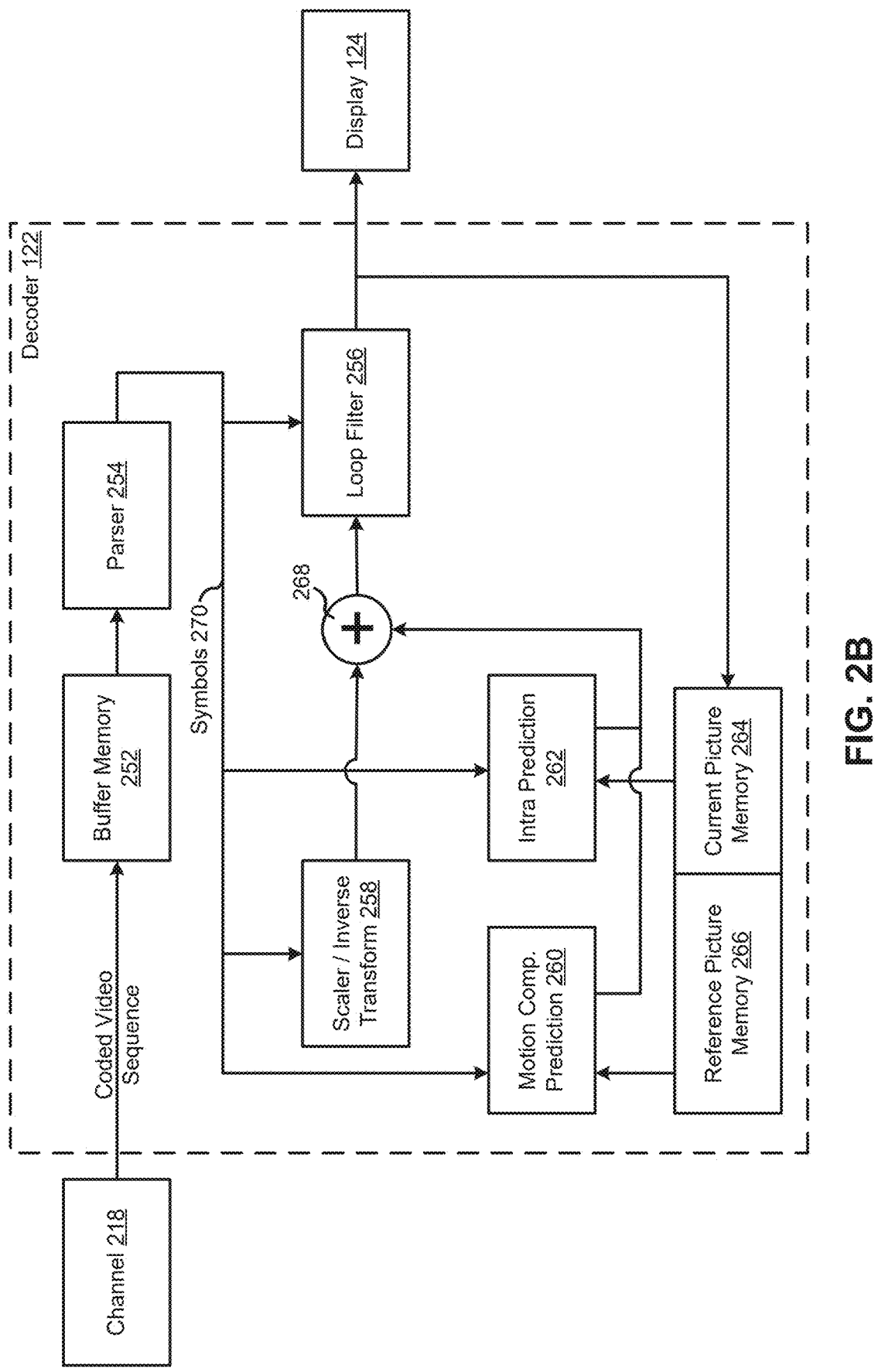
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268. In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation may also include interpolation of sample values as fetched from the reference picture memory 266, e.g., when subsample exact motion vectors are in use, motion vector prediction mechanisms.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
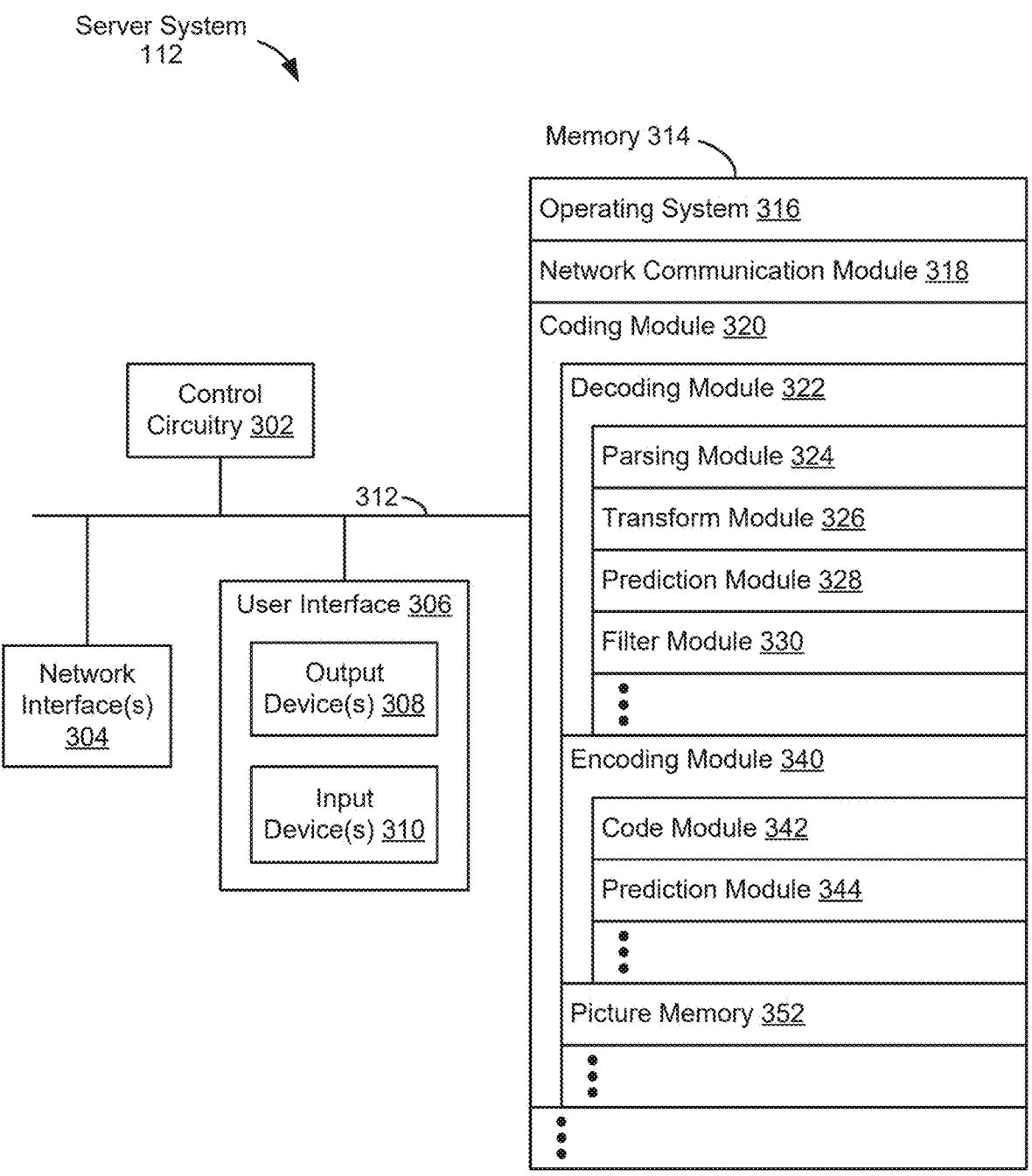
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s), hardware accelerators, and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

- an operating system 316 that includes procedures for handling various basic system services and for performing hardware-dependent tasks;
- a network communication module 318 that is used for connecting the server system 112 to other computing devices via the one or more network interfaces 304 (e.g., via wired and/or wireless connections);
- a coding module 320 for performing various functions with respect to encoding and/or decoding data, such as video data. In some embodiments, the coding module 320 is an instance of the coder component 114. The coding module 320 including, but not limited to, one or more of:

- a decoding module 322 for performing various functions with respect to decoding encoded data, such as those described previously with respect to the decoder component 122; and
- an encoding module 340 for performing various functions with respect to encoding data, such as those described previously with respect to the encoder component 106; and
- a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). According to some embodiments, methods for applying non-separable transform kernels to residual blocks are described. As used herein, a block may refer to a coding tree block, the largest coding block, a pre-defined fixed block size, a coding block, a prediction block, a residual block, or a transform block. An inter mode coded block (or inter block) refers to a block using a inter prediction mode, and an intra mode coded block (or intra block) refers to a block using an intra prediction mode.

A primary transform may belong to the family of sinusoidal transforms (DCT's, DST's, flipped versions of DCT's and ADST's). DCT may refer to any transforms that use a transform kernel originating from the discrete cosine transform basis (e.g., DCT type 2), and DST/ADST may refer to any transforms that use a transform kernel originating from the discrete sine transform basis (e.g., DST type 4 or 7).

A primary transform may belong to the family of generalized line graph transforms (LGT) or it may be a training-based kernel. A secondary transform set may be a grouping of one or more non-separable secondary transform kernel transform types. Unique or common secondary transform sets may be defined for each primary transform type, and/or intra or inter mode type.

Additionally, non-separable transforms can refer to primary transforms applied directly to residuals, or secondary transforms applied on the transform coefficient blocks produced by the primary transform. Non-separable transform kernels can be grouped into sets denoted by set indices and kernel indices within a set. Non-separable secondary transforms may be trained kernels applied to primary transform coefficients at the encoder or dequantized coefficients at the decoder.

A non-separable secondary transform kernel can be considered as a collection of basis vectors in a vector space. If represented as a matrix of size M×N (M rows and N columns), N corresponds to the dimension of vector space and M the number of bases. Thus, M×N can be used to represent kernel size. Examples of kernel sizes include, but are not limited to, 64×64 samples, 32×64 samples, 16×64 samples, 8×84 samples, 4×64 samples, 16×16 samples, 8×16 samples, 4×16 samples.

An end of block (EOB) value corresponds to the position of the last significant (e.g., non-zero) coefficient following a given coefficient scanning order in a coded block. All coefficients in positions beyond the EOB are zero for a given coefficient scanning order. In some embodiments, if a non-separable secondary transform kernel of size M×N is applied to a coded block, the EOB value is ≤M.

A scanning order refers to the coefficient reorganization process that maps a two-dimensional primary transform coefficient array to a one-dimensional primary transform coefficient array as the input the forward secondary transform, it can also refer to the backward coefficient reorganization process that maps a one-dimensional secondary transform coefficient array back to a two-dimensional primary transform coefficient array.

Figures 4A, 4B, 4C, 4D:
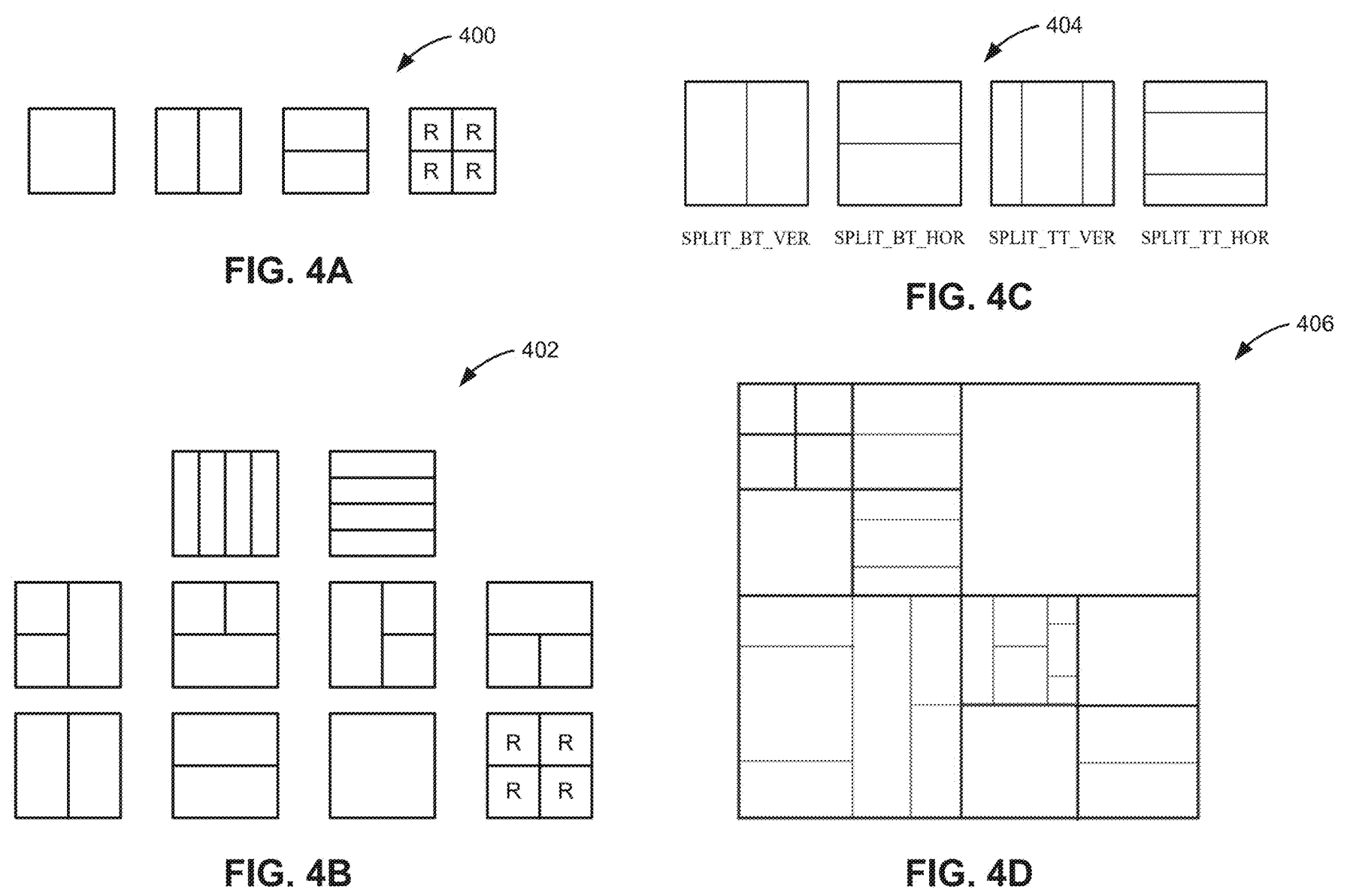

Turning first to block partitioning, FIGS. 4A-4D illustrate example coding tree structures in accordance with some embodiments. As shown in a first coding tree structure (400) in FIG. 4A, some coding approaches use a 4-way partition tree starting from a 64×64 level down to a 4×4 level, e.g., with some additional restrictions for blocks 8×8. In FIG. 4A, partitions designated as "R" are recursive in that the same partition tree is repeated at a lower scale until the lowest level is reached. As shown in the example coding tree structure (402) in FIG. 4B, some coding approaches expand the partition tree to a 10-way structure and increase the largest size (e.g., sometimes referred to as a superblock) to start from 128×128. The second coding tree structure includes 4:1/1:4 rectangular partitions that are not in the first coding tree structure. The partition types with 3 sub-partitions in the second row of FIG. 4B are referred to as T-type partitions. In addition to a coding block size, coding tree depth can be defined to indicate the splitting depth from the root note.

As an example, a coding tree unit (CTU) may be split into coding units (CUs) by using a quad-tree structure denoted as a coding tree to adapt to various local characteristics. In some embodiments, the decision on whether to code a picture area using inter-picture (temporal) or intra-picture (spatial) prediction is made at the CU level. Each CU can be further split into one, two, or four prediction units (PUs) according to the PU splitting type. Inside a PU, the same prediction process is applied, and the relevant information may be transmitted to the decoder on a PU basis. After obtaining the residual block by applying the prediction process based on the PU splitting type, a CU can be partitioned into transform units (TUs) according to another quad-tree structure like the coding tree for the CU.

A quad-tree with nested multi-type tree using binary and ternary splits segmentation structure may be used to replace the concepts of multiple partition unit types. In the coding tree structure, a CU can have either a square or rectangular shape. A CTU is first partitioned by a quaternary tree structure. The quaternary tree leaf nodes can be further partitioned by a multi-type tree structure. As shown in a third coding tree structure (404) in FIG. 4C, the multi-type tree structure includes four splitting types. The multi-type tree leaf nodes are called CUs, and unless the CU is too large for the maximum transform length. This means that, the CU, PU, and TU may have the same block size in the quad-tree with a nested multi-type tree coding block structure. An example of block partitions for one CTU (406) is shown in FIG. 4D, which illustrates an example quadtree.

The coding tree scheme supports the ability for the luma and chroma to have a separate block tree structure, such as in VTM7. In some cases, for P and B slices, the luma and chroma CTBs in one CTU share the same coding tree structure. However, for I slices, the luma and chroma can have separate block tree structures. When a separate block tree mode is applied, a luma CTB is partitioned into CUs by one coding tree structure, and the chroma CTBs are partitioned into chroma CUs by another coding tree structure. This means that a CU in an I slice may include, or consist of, a coding block of the luma component or coding blocks of two chroma components, and a CU in a P or B slice may always include, or consist of, coding blocks of all three color components unless the video is monochrome.

Turning now to transforms and transform blocks, the transforms performed during decoding of the video bitstream may be inverses of the transformed performed during encoding of the video bitstream, and are sometimes referred to as "inverse transforms". For simplicity, the transformations described herein are referred to as "transforms" whether performed during encoding or decoding.

Multiple transform sizes (e.g., ranging from 4-point to 64-point for each dimension) and transform shapes (e.g., square or rectangular with width/height ratio's 2:1/1:2 and 4:1/1:4) may be utilized. Notably, while the encoder component applies transforms, the decoder component performs the inverse transforms. Thus, in the description below, transforms described in the context of the decoder component may be the inverse of the transforms applied on the encoder side.

A two-dimensional transform process may involve the use of hybrid transform kernels (e.g., composed of different one-dimensional transforms for each dimension of the coded residual block). Primary one-dimensional transforms may include at least one of a) 4-point, 8-point, 16-point, 32-point, 64-point discrete cosine transform DCT-2; b) 4-point, 8-point, 16-point asymmetric discrete sine transforms (DST-4, DST-7) and their flipped versions; or c) 4-point, 8-point, 16-point, 32-point identity transforms. The basis functions for the DCT-2 and asymmetric DSTs, such as used in AV1, are listed in Table 1.

TABLE 1

Example Primary Transform Basis Functions

| Transform Type | Basis function $T_i(j)$, i, j = 0, 1, . . . , N − 1 |
|---|---|
| DCT-2 | $T_i(j) = \omega_0 \cdot \sqrt{\dfrac{2}{N}} \cdot \cos\left(\dfrac{\pi \cdot i \cdot (2j+1)}{2N}\right)$ <br><br> where $\omega_0 = \begin{cases} \sqrt{\dfrac{2}{N}} & i = 0 \\ 1 & i \neq 0 \end{cases}$ |
| DST-4 | $T_i(j) = \sqrt{\dfrac{2}{N}} \cdot \sin\left(\dfrac{\pi \cdot (2i+1) \cdot (j+1)}{4N}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |
| IDTX | $T_i(j) = (\,i == j\,)\ 1{:}0$ |

The availability of hybrid transform kernels may be based on the transform block size and prediction mode. Example dependencies are listed in Table 2 below, where "→" and "↓" denote the horizontal and vertical dimensions, and "√" and "x" denote the availability of a kernel for that block size and prediction mode. IDTX (or IDT) stands for identity transform.

TABLE 2

Availability of Hybrid Transform Kernels

| Transform Types | Description | Prediction mode Intra | Prediction mode Inter |
|---|---|---|---|
| DCT_DCT | DCT ↓ and → | ✓ (all block sizes) | ✓ (all block sizes) |
| ADST_DCT | ADST ↓; DCT → | ✓ | ✓ |
| DCT_ADST | DCT ↓; ADST → | (block size ≤16 × 16) | (block size ≤16 × 16) |
| ADST_ADST | ADST ↓ and → | | |
| FLIPADST_DCT | FLIPADST ↓; DCT → | x | ✓ |
| DCT_FLIPADST | DCT ↓; FLIPADST → | | (block size ≤16 × 16) |
| FLIPADST_FLIPADST | FLIPADST ↓ and → | | |
| ADST_FLIPADST | ADST ↓; FLIPADST → | | |
| FLIPADST_ADST | FLIPADST ↓; ADST → | | |
| IDTX | IDTX ↓ and → | ✓ (block size ≤16 × 16) | ✓ (block size ≤32 × 32) |
| V_DCT | DCT ↓; IDTX → | ✓ | ✓ |
| H_DCT | IDTX ↓; DCT → | (block size <16 × 16) | (block size ≤16 × 16) |
| V_ADST | ADST ↓; IDTX → | x | ✓ |
| H_ADST | IDTX ↓; ADST → | | (block size <16 × 16) |
| V_FLIPADST | FLIPADST ↓; IDTX → | x | ✓ |
| H_FLIPADST | IDTX ↓; FLIPADST → | | (block size <16 × 16) |

For a chroma component, the transform type selection may be performed in an implicit way. For intra prediction residuals, the transform type may be selected according to the intra prediction mode, as specified in Table 3 for example. For inter prediction residuals, the transform type may be selected according to the transform type selection of the co-located luma block. Therefore, for chroma component, no transform type signaling in the bitstream may be needed.

TABLE 3

Transform Type Selection for Chroma Intra Prediction Residuals

| Intra prediction | Vertical Transform | Horizontal Transform |
|---|---|---|
| DC_PRED | DCT | DCT |
| V_PRED | ADST | DCT |
| H_PRED | DCT | ADST |
| D45_PRED | DCT | DCT |
| D135_PRED | ADST | ADST |
| D113_PRED | ADST | DCT |
| D157_PRED | DCT | ADST |
| D203_PRED | DCT | ADST |
| D67_PRED | ADST | DCT |
| SMOOTH_PRED | ADST | ADST |
| SMOOTH_V_PRED | ADST | DCT |
| SMOOTH_H_PRED | DCT | ADST |
| PAETH_PRED | ADST | ADST |

Figure 5A:
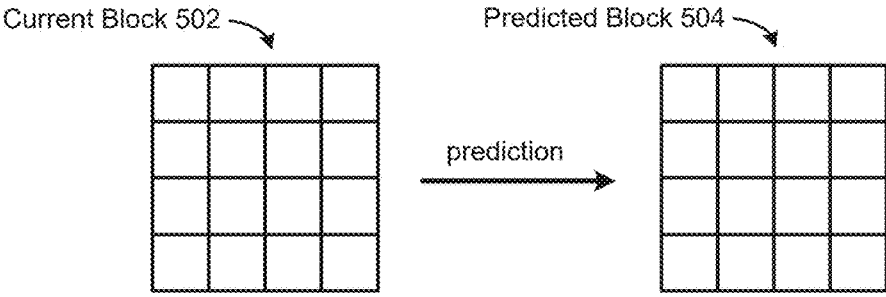
FIGS. 5A-5C illustrate example prediction blocks, residual blocks, and reconstructed blocks according to some embodiments.
Figure 5B:
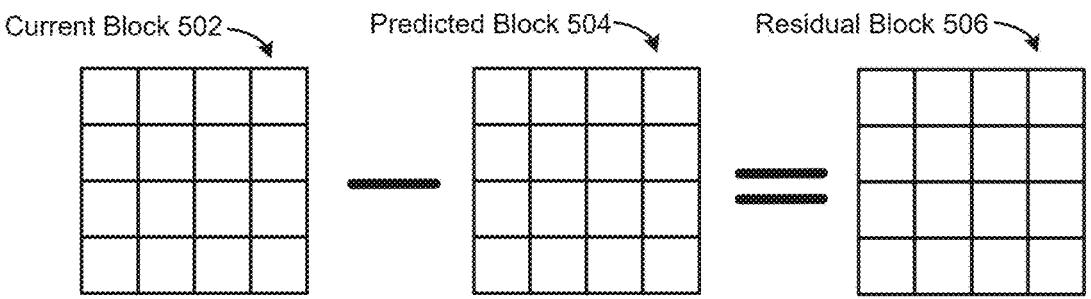
Figure 5C:
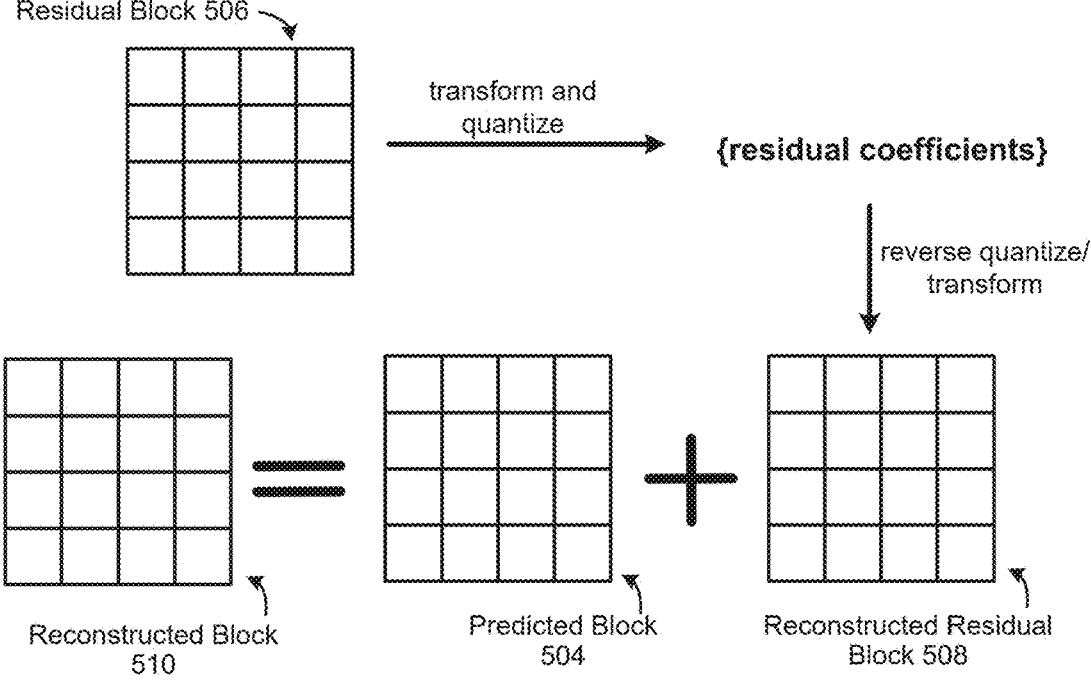

Turning now to example encoding and decoding using prediction and residual blocks, FIG. 5A illustrates the computation of a prediction block in accordance with some embodiments. In the example of FIG. 5A, an intra prediction is performed on a current block 502 to generate a predicted block 504. In some embodiments, an inter prediction is performed to generate the predicted block. The current block 502 includes a set of samples (e.g., pixel blocks) and the prediction block 504 includes a set of predictions that correspond to the set of samples. FIG. 5B illustrates the computation of a residual block in accordance with some embodiments. As shown in FIG. 5B, the prediction block 504 is subtracted from the current block 502 to generate a residual block 506 that includes a set of residues. For example, respective differences are calculated between each sample and the corresponding prediction. FIG. 5C illustrates the computation of a reconstructed block in accordance with some embodiments. As shown in FIG. 5C, the residual block 506 undergoes one or more transformations and quantization to generate a set of residual coefficients. The set of residual coefficients may be transmitted from an encoder component to a decoder component. The set of residual coefficients undergo a reverse quantization and reverse transformation to generate a reconstructed residual block 508. The reconstructed residual block 508 is combined with the predicted block 504 (e.g., reconstructed residues of the reconstructed residual block 508 are added to predictions of the prediction block 504) to generate a reconstructed block 510 corresponding to the current block 502.

In some embodiments, separable transforms, such as those shown in Table 1, are applied on intra residual and inter residual samples. In some embodiments, an intra secondary transform (IST) scheme is customized for a video coding library (e.g., used for transforming intra residual blocks). The IST scheme can efficiently capture directional patterns in intra residual samples with lower complexity compared to non-separable primary transforms. In an IST scheme the nominal intra prediction angles can be used to categorize the IST kernels.

Intra residual samples can present arbitrary directed texture patterns that can be more efficiently captured by non-separable transforms. However, the use of non-separable transforms for larger block sizes is limited due to complexities in their implementations. A non-separable secondary transform scheme that can capture most of the directionality, but with lower complexity due to its application on only the low frequency coefficients of the separable primary transform, can be applied to larger block sizes with less complexity.

In some embodiments, the IST scheme is incorporated on top of an intra prediction scheme. The IST scheme can include 12 sets of secondary transforms, with 3 kernels in each set. Table 4 shows an example secondary transform set selection and the corresponding indices used for transform set selection. The left column indicates the intra prediction modes with available transform kernels and the right column row indicates the set index. For example, at the encoder, for each mode, the best kernel from the set is selected based on RDO and signaled (4 symbols, including no IST). In this example, at the decoder, the bitstream is parsed to get the kernel used.

TABLE 4

Secondary transform set selection

| Intra prediction | Set index |
| --- | --- |
| DC_PRED | 0 |
| V_PRED | 1 |
| H_PRED | 2 |
| D45_PRED | 3 |
| D135_PRED | 4 |
| D113_PRED | 5 |
| D157_PRED | 6 |

TABLE 4-continued

Secondary transform set selection

| Intra prediction | Set index |
| --- | --- |
| D203_PRED | 7 |
| D67_PRED | 8 |
| SMOOTH_PRED | 9 |
| SMOOTH_V_PRED | 10 |
| SMOOTH_H_PRED | 11 |

In some embodiments, the secondary transform set is derived based on the intra prediction directions and the kernel type within a set is explicitly signaled. In some embodiments, the IST is enabled when either DCT-2 or ADST is used as both the horizontal and vertical primary transforms. In some embodiments, the IST is enabled only for luma intra blocks. For example, according to the block size, a 4×4 non-separable transform or 8×8 non-separable transform can be selected. If min (tx_width, tx_height)<8 the 4×4 IST can be selected. For larger blocks with both tx_width and tx_height being greater than or equal to 8, 8×8 IST can be used. Here tx_width and tx_height correspond to the transform block width and height respectively. The input to the IST may be low frequency primary transform coefficients in a zig-zag scan order, which may be the default scan order. This helps to achieve more efficient decorrelation of neighboring low frequency coefficients.

In some embodiments, both intra and inter coded blocks can be further partitioned into multiple transform units (e.g., with a partitioning depth up to 2 levels). In some embodiments, application of IST is limited to the root (depth 0) of the transform partitioning tree structure. A decrease in the overall encoding time complexity (~50%) with minimal impact in compression efficiency (~0.25% loss) may be achieved by this limitation. In some embodiments using the IST scheme, a square transform block size is utilized to derive the context information, and thereby the contexts, to be used for entropy coding the kernel index. For rectangular transform blocks, the next smallest square size may be utilized.

In some embodiments, a IST scheme defines 14 sets of secondary transforms, with 3 kernels in each set. The IST set selection may depend on the intra prediction mode employed for residual generation. Table 5 below describes the mapping between intra prediction modes, a primary transform type, and an IST set index. The first column indicates the intra prediction modes with available kernels, the second indicates primary transform type and the third indicates the set index. According to the block size, a 16-point or 64-point IST may be selected. If min (tx_width, tx_height)<8, the 16-point IST can be selected. For larger blocks with both tx_width and tx_height being greater than or equal to 8, the 64-point IST may be used. Here tx_width and tx_height correspond to transform block width and height respectively. The transform coefficients outside the region of application (RoA) of IST (primary only transform coefficients) may be zeroed out.

Table 5 below shows that the 14 secondary transform sets are dependent on two primary transform types, DCT_DCT and ADST_ADST. Hence, only 7 different sets need be signaled for one primary transform type.

TABLE 5

| Secondary transform set selection | | |
| --- | --- | --- |
| Intra nominal mode | Primary transform type | IST set index |
| DC_PRED | DCT Only | 0 |
| V_PRED | | 1 |
| H_PRED | | 1 |
| D45_PRED | | 2 |
| D135_PRED | | 3 |
| D113_PRED | | 4 |
| D157_PRED | | 4 |
| D203_PRED | | 5 |
| D67_PRED | | 5 |
| SMOOTH | | 6 |
| SMOOTH_V | | 1 |
| SMOOTH_H | | 1 |
| DC_PRED | ADST only | 7 |
| V_PRED | | 8 |
| H_PRED | | 8 |
| D45_PRED | | 9 |
| D135_PRED | | 10 |
| D113_PRED | | 11 |
| D157_PRED | | 11 |
| D203_PRED | | 12 |
| D67_PRED | | 12 |
| SMOOTH | | 13 |
| SMOOTH_V | | 8 |
| SMOOTH_H | | 8 |

In some embodiments, the probabilistic context selected for each set is derived from the intra prediction modes. In some embodiments, an encoder component chooses the IST set implicitly based on a predefined mapping between intra prediction modes and IST sets. In some embodiments, the encoder performs an additional search on all the available IST sets (e.g., instead of checking only one IST set depending on the intra prediction mode), so that the encoder can make rate-distortion optimized decisions on the selection of IST set.

In some embodiments, the IST is enabled for inter coded blocks. For example, the IST kernels that are used for intra coded blocks are also applied to inter coded blocks. In some embodiments, the IST kernels that are used for intra coded blocks are reused for inter coded blocks with no changes or additions. In some embodiments, the above description on IST for intra coded blocks is also applicable to inter coded blocks. For example, the encoder can select from multiple sets and multiple kernels within a set (e.g., 7 sets and 3 kernels within a set). The kernel and set index may be explicitly signaled.

In some embodiments, IST is enabled for inter coded blocks using DCT_DCT or ADST_ADST as primary transform. For example, only the kernel index is signaled for inter blocks and the set used corresponds to DC_PRED or set index 0.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) receiving a video bitstream (e.g., a coded video sequence) comprising a set of one or more encoded blocks (e.g., corresponding to one or more pictures) and a corresponding set of transform coefficients. The system selects (604) a non-separable secondary transform from a set of one or more non-separable secondary transforms based an index value (e.g., a signaled index value or a derived index value). In some embodiments, the system selects a secondary transform from a set of one or more secondary transforms (e.g., separable and/or non-separable). In some embodiments, the system selects a primary transform from a set of one or more primary transforms (e.g., separable and/or non-separable). The system determines (606), based on coded information, a kernel size and kernel shape for the non-separable secondary transform. In some embodiments, the system determines only one of the kernel size and kernel shape based on the coded information. The system decodes (608) the set of encoded blocks by applying the non-separable secondary transform with the determined kernel size and kernel shape to the set of encoded blocks.

In some embodiments, coded information is used to adaptively determine the non-separable secondary (or separable secondary, or non-separable primary) transform kernel sizes, shapes (e.g., representing a subset of a full kernel), and/or scanning orders in secondary transform sets. The coded information refers to any information that is known to both encoder and decoder when coding a current block, such as signaled flags or reconstructed information.

In some embodiments, non-separable secondary transform kernel sizes are different in transform sets corresponding to different primary transform types. For example, the coded information includes primary transform types. As an example, if DCT is the primary transform, the kernel size M×N used may be a first size (e.g., 32×64) and, if DST/ADST is the primary transform, the kernel size may be a second size (e.g., 16×64 or 8×64), where the first size can be greater than or smaller than the second block size.

In some embodiments, the coded information includes transform block size. For example, if the transform block size is 8×8, the kernel size may be 32×64 (e.g., a matrix of values) or 16×64 (e.g., a subset of the 32×64 matrix).

In some embodiments, non-separable secondary transform kernel sizes are different in transform sets corresponding to different intra or inter predicted modes. For example, the coded information includes prediction modes. As an example, if DC (or SMOOTH, or PLANAR) prediction is the intra mode, the kernel size M×N used may be a first size (e.g., 32×64) and, for another mode or modes, the kernel size may be a second size (e.g., 16×64 or 8×64), where the first size can be greater than or smaller than the second block size.

In some embodiments, non-separable secondary transform kernel sizes are different for each kernel in a set. For example, in a transform set with 3 kernels, the kernel sizes may be 8×64, 16×64, 32×64.

In some embodiments, a (non-separable secondary) transform kernel index and/or transform set is signaled for a block only if EOB greater than M. In an example, possible values of M include but not limited to 1, 2, . . . 64. In some embodiments, because the value of M may be different for different transform kernels in a set, the symbol size used for signaling kernel index is different (e.g., to select a kernel that covers the EOB value). In some embodiments, EOB groups are defined, and the EOB group is used as context for signaling non-separable secondary transform kernel index and/or transform set. For example, EOB values in range 1-8, 9-16, 17-32, 33-64 may be mapped to EOB groups 0, 1, 2 and 3. In some embodiments, the coded information comprises the EOB and/or EOB group for the current block and/or neighboring blocks.

In some embodiments, the region of the primary transform coefficients where the non-separable secondary transform kernel may be applicable is dependent on coded information. For example, for a first non-separable secondary transform kernel, the top left M×N rectangular primary coefficient region may be the input to forward secondary transform or the output of inverse secondary transform. As another example, for a second non-separable secondary transform kernel, the low-frequency rectangular primary coefficient located in the top-left triangular region may be the input to forward secondary transform or the output of inverse secondary transform.

In some embodiments, the scanning order applied in non-separable secondary transform kernel is dependent on coded information. For example, for a first non-separable secondary transform kernel, the scanning order is a M×N coefficient group based scanning order, and, for a second non-separable secondary transform kernel, the scanning order is a zig-zag/diagonal coding block based scanning order.

In some embodiments, primary transform coefficient regions that do not apply the secondary transform are selectively zeroed-out based on coded information. For example, for a first non-separable secondary transform kernel, a first number of primary transform coefficients are zeroed out, while for a second non-separable secondary transform kernel, a second number of primary transform coefficients are zeroed out. The first number and second number can be different depending on coded information.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system. In some embodiments, the method 650 is performed by a same system as the method 600 described above.

The system receives (652) receiving video data (e.g., a source video sequence) comprising a set of one or more blocks. The system selects (654) a non-separable secondary transform from a set of one or more non-separable secondary transforms. In some embodiments, the system selects a secondary transform from a set of one or more secondary transforms (e.g., separable and/or non-separable). In some embodiments, the system selects a primary transform from a set of one or more primary transforms (e.g., separable and/or non-separable). The system determines (656), based on coded information, a kernel size and kernel shape for the non-separable secondary transform. In some embodiments, the system determines only one of the kernel size and kernel shape based on the coded information. The system encodes (658) the set of blocks by applying the non-separable secondary transform with the determined kernel size and kernel shape to the set of blocks. As described previously, the encoding process may mirror the decoding processes described herein (e.g., applying transformations). For brevity, those details are not repeated here.

Although FIGS. 6A and 6B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

Turning now to some example embodiments. In the embodiments described below, non-separable secondary transforms are described. However, in some embodiments, the transforms are separable secondary transforms and/or primary transforms.

(A1) In one aspect, some embodiments include a method (e.g., the method 600) of video decoding. In some embodiments, the method is performed at a computing system (e.g., the server system 112) having memory and control circuitry. In some embodiments, the method is performed at a coding module (e.g., the coding module 320). In some embodiments, the method is performed at a source coding component (e.g., the source coder 202), a coding engine (e.g., the coding engine 212), and/or an entropy coder (e.g., the entropy coder 214). The method includes (i) receiving a video bitstream (e.g., a coded video sequence) comprising a set of encoded blocks (e.g., corresponding to one or more pictures) and a corresponding set of transform coefficients; (ii) selecting a non-separable secondary transform from a set of one or more non-separable secondary transforms based an index value (e.g., a signaled or derived index value); (iii) determining, based on coded information, a kernel size and/or kernel shape for the non-separable secondary transform; and (iv) decoding the set of encoded blocks by applying the non-separable secondary transform with the determined kernel size and kernel shape to the set of encoded blocks. For example, coded information may be used to adaptively determine transform kernel sizes, shapes, and/or scanning orders in transform sets. In some embodiments, the transform is a non-separable secondary transform. The coded information may refer to any information that is known to both encoder and decoder when coding a block, such as signaled flags and reconstructed information. In some embodiments, a kernel size and kernel shape is determined for a separable secondary transform based on the coded information. In some embodiments, a kernel size and kernel shape is determined for a primary transform based on the coded information. In some embodiments, different kernel sizes are used for different block sizes. In some embodiments, the kernel size and kernel shape are selected from respective sets of kernel sizes and kernel shapes available to the decoder.

(A2) In some embodiments of A1, the coded information comprises a primary transform type for the set of encoded blocks. For example, non-separable secondary transform kernel sizes may be different in transform sets corresponding to different primary transform types.

(A3) In some embodiments of A2: (i) when the primary transform type comprises a discrete cosine transform (DCT), a first kernel size is selected for the set of encoded blocks; and (ii) when the primary transform type comprises a discrete sine transform (DST), a second kernel size is selected for the set of encoded blocks, the second kernel size being different than the first kernel size. For example, if DCT is the primary transform, a kernel size (M×N) used may be a first size (e.g., 32×64). As another example, if DST/ADST is the primary transform, the kernel size may be a second size (e.g., 16×64 or 8×64). The first size may be greater than or smaller than the second size.

(A4) In some embodiments of any of A1-A3, the coded information comprises a transform block size. For example, if the transform block size is 8×8, the kernel size may be 32×64 matrix of values or a 16×64 matrix of values (e.g., a subset of the 32×64 matrix).

(A5) In some embodiments of any of A1-A4, the coded information comprises prediction mode information for the set of encoded blocks. For example, the non-separable secondary transform kernel sizes may be different in transform sets corresponding to different intra or inter predicted modes.

(A6) In some embodiments of A5: (i) when the prediction mode information comprises a non-directional intra prediction mode, a first kernel size is selected for the set of encoded blocks; and (ii) when the prediction mode information does not comprise a non-directional intra prediction mode, a second first kernel size is selected for the set of encoded blocks. For example, if a DC (or SMOOTH, or PLANAR) prediction is the intra mode, the kernel size (M×N) used may be a first size (e.g., 32×64) and for another mode or modes, the kernel size may be a second size (e.g., 16×64 or 8×64). The first size may be greater than or smaller than the second size.

(A7) In some embodiments of any of A1-A6, the coded information comprises a selected kernel for the non-separable secondary transform. For example, non-separable secondary transform kernel sizes may be different for each kernel in a set. As an example, in a transform set with 3 kernels, the kernel sizes may be 8×64, 16×64, 32×64.

(A8) In some embodiments of any of A1-A7, the method further includes: (i) determining whether an end-of-block (EOB) value for the set of encoded blocks meets one or more criteria; (ii) when the EOB value meets the one or more criteria, obtaining the index value from the video bitstream; and (iii) when the EOB value does not meet the one or more criteria, forgoing obtaining the index value from the video bitstream (e.g., deriving the index value). For example, a non-separable secondary transform kernel index and/or transform set is signaled for a block only if EOB is greater than (or equal to) M, where values of M may include 1, 2, . . . 64.

(A9) In some embodiments of A8, the index value is obtained from a symbol in the video bitstream, and a size of the symbol corresponds to the kernel size. For example, because the value of M may be different for different transform kernels in a set, the symbol size used for signaling kernel index may be different (e.g., a kernel is selected that covers the EOB value).

(A10) In some embodiments of A8 or A9, the one or more criteria include a criterion based on an EOB group for the EOB value. For example, EOB groups may be defined, and the EOB group used as context for signaling the non-separable secondary transform kernel index and/or the transform set. As an example, EOB values in ranges 1-8, 9-16, 17-32, 33-64 may be mapped to EOB groups 0, 1, 2 and 3. In this way, the EOB group may be used as context information for the kernel index and/or transform set.

(A11) In some embodiments of any of A1-A10, the method further includes identifying a region of a primary transform, where the non-separable secondary transform is applied to the identified region. For example, the region of primary transform coefficients where non-separable secondary transform kernel may be applicable can be dependent on any coded information.

(A12) In some embodiments of A11, the identified region comprises a top-left rectangular region of the primary transform. For example, for a first non-separable secondary transform kernel, the top left M×N rectangular primary coefficient region may be the input to forward secondary transform or the output of inverse secondary transform.

(A13) In some embodiments of A11, the identified region comprises a top-left triangular region of the primary transform. For example, for a second non-separable secondary transform kernel, the low-frequency rectangular primary coefficient located in the top-left triangular region may be the input to forward secondary transform or the output of inverse secondary transform.

(A14) In some embodiments of any of A11-A13: (i) the primary transform comprises the identified region and one or more other regions; and (ii) the method further includes selectively zeroing-out coefficients in the one or more other regions based on the coded information. For example, whether applying zero-out (for the primary transform coefficient regions that do not apply the secondary transform) can be dependent on any coded information. As an example, for a first non-separable secondary transform kernel, a first number of primary transform coefficients are zeroed out, while for a second non-separable secondary transform kernel, a second number of primary transform coefficients are zeroed out. The first number and second number can be different depending on any coded information.

(A15) In some embodiments of any of A1-A14, the method further includes determining, based on the coded information, a scanning order for the non-separable secondary transform, where the non-separable secondary transform is applied according to the scanning order. For example, the scanning order applied in the non-separable secondary transform kernel can be dependent on any coded information.

(A16) In some embodiments of A15, the scanning order is one of: a coefficient-group-based scanning order, a diagonal scanning order, or a zig-zag scanning order. For example, for a first non-separable secondary transform kernel, the scanning order is a M×N coefficient group-based scanning order, and, for a second non-separable secondary transform kernel, the scanning order is a zig-zag or diagonal coding block-based scanning order.

(B1) In another aspect, some embodiments include a method (e.g., the method 650) of video encoding. In some embodiments, the method is performed at a computing system (e.g., the server system 112) having memory and control circuitry. In some embodiments, the method is performed at a coding module (e.g., the coding module 320). The method includes: (i) receiving video data (e.g., a source video sequence) comprising a set of blocks (e.g., corresponding to one or more pictures); (ii) selecting a non-separable secondary transform from a set of one or more non-separable secondary transforms; (iii) determining, based on coded information, a kernel size and kernel shape for the non-separable secondary transform; and (iv) encoding the set of blocks by applying the non-separable secondary transform with the determined kernel size and kernel shape to the set of blocks.

(B2) In some embodiments of B1, the coded information comprises a primary transform type for the set of blocks and/or prediction mode information for the set of blocks.

(C1) In another aspect, some embodiments include a method of visual media data processing. In some embodiments, the method is performed at a computing system (e.g., the server system 112) having memory and control circuitry. In some embodiments, the method is performed at a coding module (e.g., the coding module 320). The method includes: (i) obtaining a source video sequence that comprises a plurality of frames; and (ii) performing a conversion between the source video sequence and a video bitstream of visual media data according to a format rule. The video bitstream comprises a set of encoded blocks and a corresponding set of transform coefficients. The format rule specifies that: (a) a non-separable secondary transform for the set of encoded blocks be selected from a set of one or more non-separable secondary transforms, and (b) a kernel size and kernel shape for a selected non-separable secondary transform be determined based on coded information.

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A16, B1-B2, and C1 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A16, B1-B2, and C1 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of video decoding performed at a computing system having memory and one or more processors, the method comprising:
   receiving a video bitstream comprising a set of encoded blocks and a corresponding set of transform coefficients;
   selecting a non-separable secondary transform from a set of one or more non-separable secondary transforms based on an index value;
   determining, based on coded information that comprises a primary transform type for the set of encoded blocks, a kernel size and kernel shape for the non-separable secondary transform, including:
      when the primary transform type comprises a discrete cosine transform (DCT), selecting a first kernel size for the set of encoded blocks; and
      when the primary transform type comprises a discrete sine transform (DST) selecting a second kernel size for the set of encoded blocks, the second kernel size being different than the first kernel size; and
   decoding the set of encoded blocks by applying the non-separable secondary transform with the determined kernel size and kernel shape to the set of encoded blocks.

2. The method of claim 1, wherein the coded information comprises a transform block size.

3. The method of claim 1, wherein the coded information comprises prediction mode information for the set of encoded blocks.

4. The method of claim 3, wherein:
   when the prediction mode information comprises a non-directional intra prediction mode, a first kernel size is selected for the set of encoded blocks; and
   when the prediction mode information does not comprise a non-directional intra prediction mode, a second first kernel size is selected for the set of encoded blocks.

5. The method of claim 1, wherein the coded information comprises a selected kernel for the non-separable secondary transform.

6. The method of claim 1, further comprising:
   determining whether an end-of-block (EOB) value for the set of encoded blocks meets one or more criteria;
   when the EOB value meets the one or more criteria, obtaining the index value from the video bitstream; and
   when the EOB value does not meet the one or more criteria, forgoing obtaining the index value from the video bitstream.

7. The method of claim 6, wherein the index value is obtained from a symbol in the video bitstream, and wherein a size of the symbol corresponds to the kernel size.

8. The method of claim 6, wherein the one or more criteria include a criterion based on an EOB group for the EOB value.

9. The method of claim 1, further comprising identifying a region of a primary transform, wherein the non-separable secondary transform is applied to the identified region.

10. The method of claim 9, wherein the identified region comprises a top-left rectangular region of the primary transform.

11. The method of claim 9, wherein the identified region comprises a top-left triangular region of the primary transform.

12. The method of claim 9, wherein the primary transform comprises the identified region and one or more other regions; and the method further comprises selectively zeroing-out coefficients in the one or more other regions based on the coded information.

13. The method of claim 1, further comprising determining, based on the coded information, a scanning order for the non-separable secondary transform, wherein the non-separable secondary transform is applied according to the scanning order.

14. The method of claim 13, wherein the scanning order is one of: a coefficient-group-based scanning order, a diagonal scanning order, or a zig-zag scanning order.

15. A computing system, comprising:

control circuitry;

memory; and one or more sets of instructions stored in the memory and configured for execution by the control circuitry, the one or more sets of instructions comprising instructions for:

receiving video data comprising a set of blocks;

selecting a non-separable secondary transform from a set of one or more non-separable secondary transforms;

determining, based on coded information that comprises a primary transform type for the set of encoded blocks, a kernel size and kernel shape for the non-separable secondary transform, including:

when the primary transform type comprises a discrete cosine transform (DCT), selecting a first kernel size for the set of encoded blocks; and when the primary transform type comprises a discrete sine transform (DST), selecting a second kernel size for the set of encoded blocks, the second kernel size being different than the first kernel size; and encoding the set of blocks by applying the non-separable secondary transform with the determined kernel size and kernel shape to the set of blocks.

16. The computing system of claim 15, wherein the coded information comprises prediction mode information for the set of blocks.

17. A non-transitory computer-readable storage medium storing a video bitstream that is generated by a video encoding method and one or more instructions, the instructions when executed by a processor, cause a computing system to generate the video bitstream, the video bitstream comprising:

coded information for a set of blocks; and wherein the video encoding method comprises:

selecting a non-separable secondary transform from a set of one or more non-separable secondary transforms;

determining, based on coded information that comprises a primary transform type for the set of encoded blocks, a kernel size and kernel shape for the non-separable secondary transform, including:

when the primary transform type comprises a discrete cosine transform (DCT), selecting a first kernel size for the set of encoded blocks; and when the primary transform type comprises a discrete sine transform (DST), selecting a second kernel size for the set of encoded blocks, the second kernel size being different than the first kernel size; and encoding the set of blocks by applying the non-separable secondary transform with the determined kernel size and kernel shape to the set of blocks.

* * * * *